Dec. 9, 1924.
H. W. HILL ET AL
LENS GRINDING MACHINERY
Filed Jan. 10, 1921
1,518,406
2 Sheets-Sheet 1
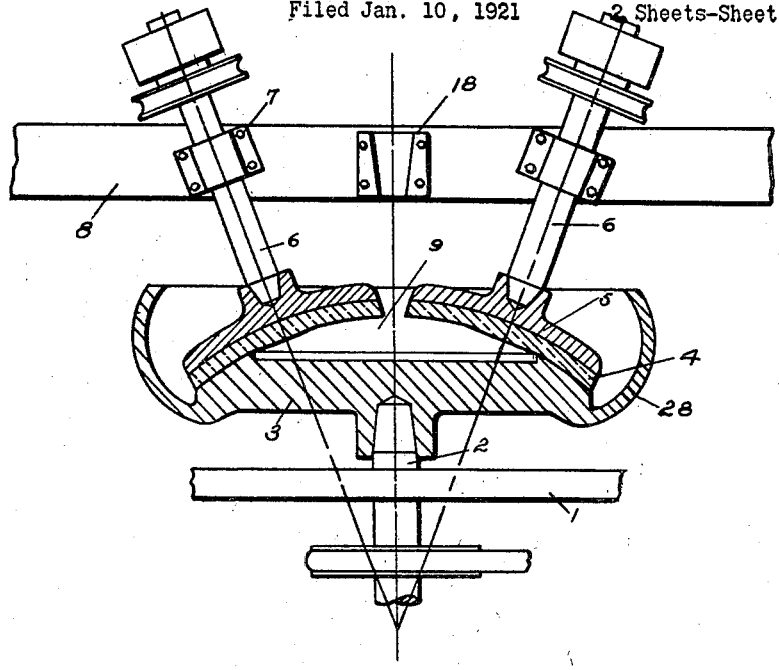
Fig. I
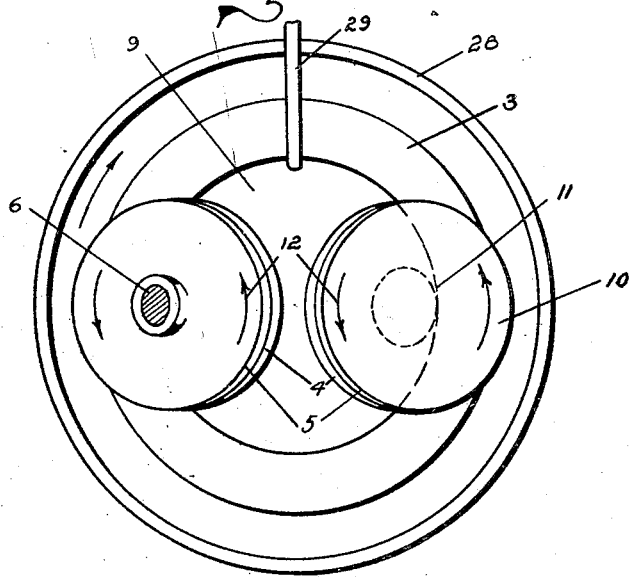
Fig. II
INVENTOR
HARRY W. HILL
HARRY H. STYLL
BY
H. H. Styll & H. K. Parsons
ATTORNEYS

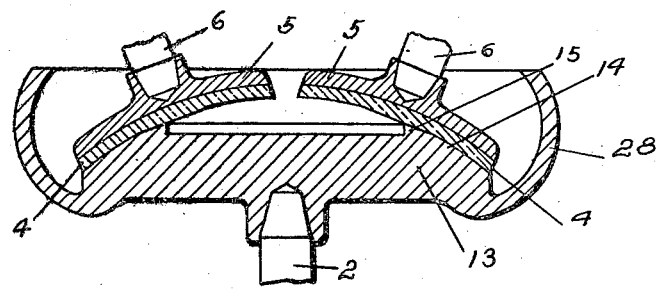
Fig. III
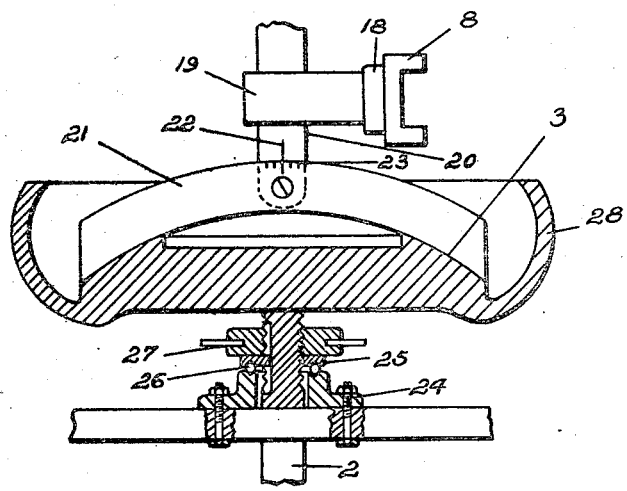
Fig. IV
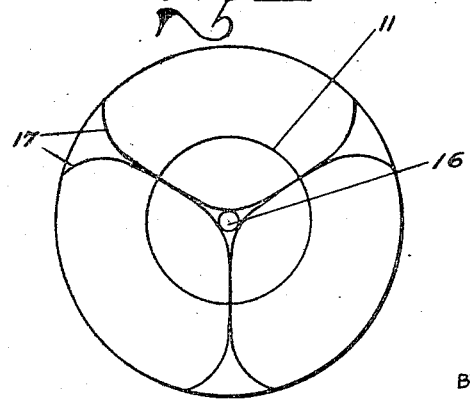
Fig. V
INVENTOR
HARRY W. HILL
HARRY H. STYLL
ATTORNEYS Patented Dec. 9, 1924.

1,518,406

UNITED STATES PATENT OFFICE.

HARRY W. HILL AND HARRY H. STYLL, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

LENS-GRINDING MACHINERY.

Application filed January 10, 1921. Serial No. 436,241.

*To all whom it may concern:*

Be it known that we, HARRY W. HILL and HARRY H. STYLL, citizens of the United States, residing at Southbridge, in the county of Worcester and State of Massachusetts, have invented certain new and useful Improvements in Lens-Grinding Machinery, of which the following is a specification.

This invention relates to improvements in lens grinding machinery and has particular reference to machinery particularly adapted for use in constructing multifocal lenses or lenses having more than one focus and formed from a single piece of glass.

The principal object of the present invention is the provision of a novel and improved construction of machine which will greatly increase the speed of production of lenses of this character and will make it possible to produce a much larger number of lenses in a given time through the use of the same amount of machinery.

A further object of the present invention is the provision of a novel and improved machine which can be employed to produce one or more surfaces if desired of different dioptrics upon the surface of a piece of glass.

Other objects and advantages of our improved construction should be readily apparent by reference to the following specification taken in connection with the accompanying drawings, and it will be understood that we may make any modifications in the specific details of construction shown and described within the scope of the appended claims without departing from or exceeding the spirit of our invention.

Figure I represents a front view partially in section of a machine embodying our improvements.

Figure II represents a semi-diagrammatic plan view thereof.

Figure III represents a fragmentary sectional view illustrating a slightly different form of our construction.

Figure IV represents a detailed sectional view illustrating the employment of the gage mechanism.

Figure V represents a plan view of the blank produced by the mechanism shown in Figure III.

It is the purpose of our invention to obviate the difficulties present in prior art constructions. In accomplishing this result we make use of the base frame portion or table 1 having suitably journaled therein the spindle 2, bearing our improved tool or lap 3 comprising an outer annular portion turned off to desired spherical curve and having the inner portion recessed or brought below the plane of said curve, as will be readily understood by reference to Figure I. Opposed to said tool in operation is the lens 4 carried by a block 5 mounted on the axially slidable rotating spindle 6. This spindle 6 is held in the bracket 7 rigidly secured to the upper frame 8 and fed as by gravity or otherwise in the direction of the tool 3. The position of the bracket 7 is so calculated that the axis of the spindle 6 will fall within the space 9 provided by cutting away a portion of the tool 3 and so that the outer portion 10 of the multifocal face of the lens will rest upon the curved surface 3 of the tool and the inner limit of the tool will come at the proper point 11 for the dividing line between the near and distant vision fields of the lens, as is diagrammatically indicated in connection with Figure II.

It will be noted in the drawings that we have shown our machine as comprising a single tool 3 and a pair of cooperating spindles 6 disposed at opposite sides, and it will be further noted that the said spindles 6 are driven in the same direction as is indicated by the arrows 12 of Figure II. The reason for this is that the outer portion only of the lens of each spindle is in engagement with the tool, the tool being shown as rotated in a clockwise direction and the two spindles in an anti-clockwise direction, so that at both sides of the machine the lens will be turning opposed to the direction of movement of the portion of lap in contact therewith. The result of this action is that the lenses become very rapidly and satisfactorily ground off, maximum relative speed of abrasion between the parts being accomplished on account of their movement in opposite directions and at the same time across paths tending to break up any possible lines of concentric grinding, this being due to the positive rotation of both lens and tool.

Figure III shows a slight modification of the structure of Figure II, in which the lower spindle 2 bears a tool 13 having a portion 14 engaging the outer part of the lens and the portion 15 engaging the inner part of the lens, but preferably stopping off just short of the alinement of axis of the upper spindle 6. The purpose of this stopping off of the width of the tool is to leave a slight tit or unground portion 16 at the center of the blank so disposed that the lines of cleavage 17 separating the blank into its component parts will extend around the portion 16 which will thus at one time aid in eliminating any possibility of the cleavage lines extending beyond the center to spoil the opposed blank, and facilitating the grinding operation, in that the grinding off of the material at the center due to the spinning of the lens 4 about that point is eliminated. It will be understood that if desired the tool could extend directly to the center and remove this center tit as well, although this might interfere slightly with the efficiency of the grinding mechanism. The advantage of the type of construction here described is that it secures simultaneous grinding of the two fields of the lens, thus aiding in increasing production from a given number of machines.

It will be understood that in employing a rigid mechanism of this character it is necessary that the tool be kept substantially at a certain height so that the spindle 6 will properly intersect therewith so the curve will be satisfactorily ground and the line of division will be smooth, even and at the right place upon the lens. That this adjustment may be satisfactorily made I preferably mount on the frame member 8 a suitable guide or holder 18 for the bracket 19, serving to support the gage hanger 20 having pivoted thereto the arcuate gage member 21, this member 21 preferably extending transversely of the machine intermediate the two lens blocks, which may be either in position or removed during the use of the gage, the gage being hung so that it will rest on the exact diameter of the tool, and being free for swinging movement so that it may properly adjust itself to the tool and determine whether it properly fits the entire surface spanned by it or not. To assist in determining whether one side is higher and the other lower, the hanger may be provided with the pointer member 22 and the gage with the graduations 23 for cooperation with the pointer. A suitable thrust bearing 24 with movable part 25 keyed as at 26 to the shaft 2 bears against the adjusting nut 27. Rotation of the nut 27, which is threaded onto the upper portion of the shaft 2 serves to raise the shaft and thus the tool carried thereby, while counter-rotation serves to lower the tool. In use the tool is ordinarily raised to compensate for its wear so that it exactly fits the gage and is in predetermined correct relation to the frame 8. The gage is then preferably lifted out of the way or entirely removed during the operation of the machine to prevent injury thereof by the abrasive employed in connection with the lap 4. The lap is provided with an upstanding inturned flange or rim 28 which retains the abrasive and aids in directing it back into operative position on the lap or tool when the latter is in use. The scraper member 29 working in the groove serves to throw the material from the groove formed by the flange 28 into the central aperture or recess 9, which aids in retaining the material, centrifugal force causing the material to work outward and under the lenses, thus forming an additional feature of value in facilitating operation of the machine and rendering the same substantially automatic in that the abrasive is continuously fed inward by the scraper to the recess and thence outward by centrifugal force underneath the lens.

We would call particular attention to the fact that in our improved mechanism as shown the lens and tool are both rigidly held opposed one to the other, while the size of recess in the center of the tool and the relationship of the parts are such that a crescent shape portion of the lens is at all times bearing on the tool and the horns of the crescent extend inward past the center of the lens and aid in keeping the same properly balanced on the tool during the grinding operation, the lens being rotated at a relatively high rate of speed and the gyroscopic action also aiding in keeping the same balanced and relieving the spindle bearings, etc., of a degree of the strain which might be present were the bearing only upon the extreme outer or edge portion of the lens.

We claim:

In a machine of the character described, a lens surfacing lap tool having a spherical grinding face and a central recess, an arcuate gage member having a circular under side adapted to exactly contact with the spherical face of the lap tool, a support for the gage member, means for pivoting the gage member on the support, scale means on the gage member and support to indicate the relationship of the gage member to the support, and means on the grinding tool adapted to raise and lower it so that its spherical grinding face may be made to exactly contact with the under side of the arcuate gage plate.

In testimony whereof we have affixed our signatures, in presence of two witnesses.

HARRY W. HILL.
HARRY H. STYLL.

Witnesses:
ALICE G. HASKELL,
SUSAN CASAZZA.